Mar. 6, 1923.
S. B. COLLIER
1,447,710
CLAMP LUG FOR TIRE RIMS
Filed Sept. 20, 1921
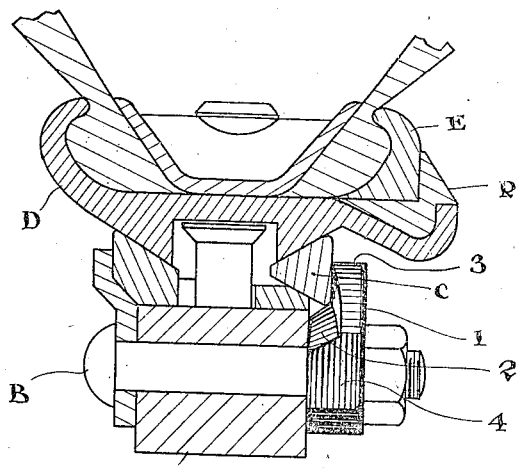
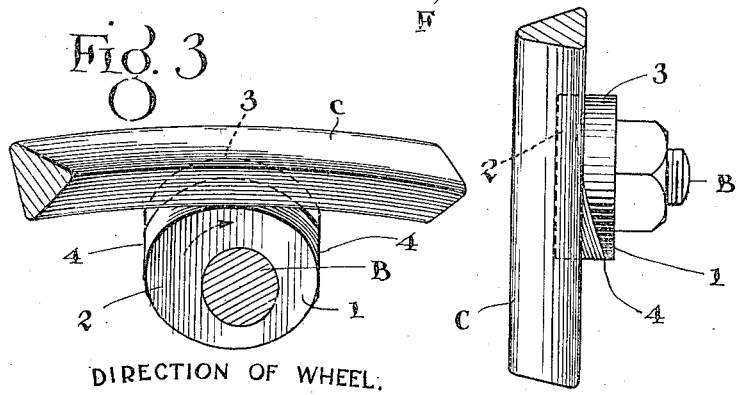
DIRECTION OF WHEEL.
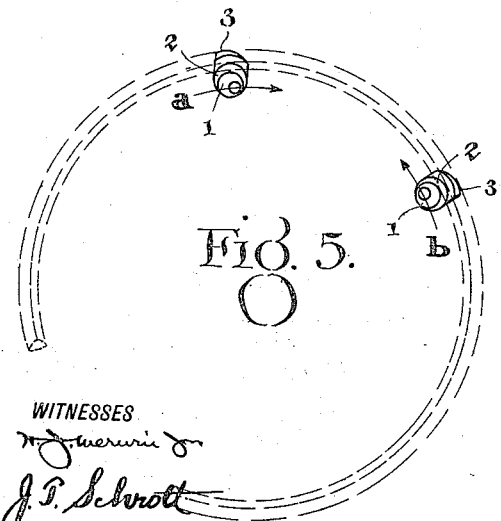
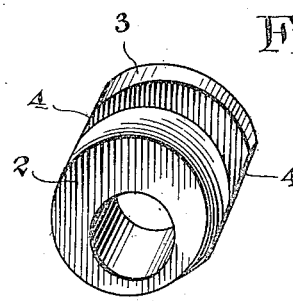
WITNESSES
INVENTOR
Shade B. Collier.
BY
ATTORNEYS Patented Mar. 6, 1923.

1,447,710

UNITED STATES PATENT OFFICE.

SHADE B. COLLIER, OF ORLANDO, CALIFORNIA.

CLAMP LUG FOR TIRE RIMS.

Application filed September 20, 1921. Serial No. 501,933.

*To all whom it may concern:*

Be it known that I, SHADE B. COLLIER, a citizen of the United States, and a resident of Orlando, in the county of Orange and State of Florida, have invented certain new and useful Improvements in Clamp Lugs for Tire Rims, of which the following is a specification.

My invention relates to improvements in tire rims and it consists substantially in the construction, combination and mode of operation herein described and claimed.

One of the foremost objects of the invention is to provide an improved clamp lug for holding the clamping ring of a tire rim in place.

Another object of the invention is to provide an improved clamp lug which may be swung out of the ring-engaging position without removing it from the bolt.

A further object of the invention is to provide an improved clamp lug which has a wedge and an eccentric, both tending to tighten the clamping ring with each forward or backward impulse of the wheel, especially in starting.

Other objects and advantages will appear in the following specification, reference being had to the accompanying drawing, in which:—

Figure 1 is a cross section of a portion of a quick detachable, demountable rim, illustrating the application of the improved clamp lug, Figure 2 is a detail plan view showing how the wedge of the clamp lug engages the clamping ring, Figure 3 is a detail side elevation showing how the eccentric engages the underside of the clamping ring, Figure 4 is a detail perspective view of one of the clamp lugs, and Figure 5 is a detail diagram referred to below.

The improved clamp lug consists of a substantially circular body 1, made of steel or any other suitable material, which includes an eccentric 2 and a wedge periphery 3. The clamp lug is secured to the felly F of the wheel by a bolt B, in a manner precisely like that in which the ordinary clamp lug is secured.

Figure 1 illustrates a part of a quick detachable, demountable rim tire. The clamping ring C holds all of the parts including the base D, locking ring R and clincher side ring E in place. The clamp lug 1 in turn is for the purpose of holding the clamping ring C in place or may be used against any clamping device of other type of wheels.

In operation, the clamp lug 1 is swung up on the bolt B in the direction of the dotted arrow in Figure 3, until the eccentric 2 binds so firmly against the clamping ring that the latter retains a perfectly tight engagement with the adjacent face. The nut on the bolt B is then tightened to hold the lug in position.

At the same time that the eccentric 2 binds beneath the clamping ring C, the wedge 3 also exerts an inward pressure on the ring so that the latter is forced toward the center of the wheel. The clamp lugs are made in rights and lefts, necessarily so because they must be fitted on the outside of right and left hand wheels.

But both right and left lugs are used on one side of the same wheel, and this for the purpose of securing a jamming or wedging effect on the clamping ring C on the initial movement of the wheel both in the forward and backward direction. Consider Figure 3 which illustrates the appearance of one of the lugs on the left rear wheel of an automobile.

In starting forwardly (see long arrow) the lagging of the tire (due to its inertia) behind the parts of the wheel nearer the hub, will result in forcing the eccentric 2 and the wedge 3 tighter beneath and at the side respectively, of the clamping ring C. The forces exerted by the eccentric and wedge are maintained as long as the wheel continues to revolve. The result is that the clamping ring cannot loosen, and in fact, the longer the wheel revolves, the tighter will the engagement of the clamp lug be.

Figure 5 is a diagram illustrating how right and left lugs work on the same wheel. The gripping action of the lugs described in connection with Figure 3, is illustrated by the arrow *a* in Figure 5. This gripping action occurs on a forward motion of the wheel. In order to obtain the same gripping action on the clamping ring C on a backward motion of the wheel, the eccentric 2 and wedge 3 must be reversed in relationship to the bolt B.

This reversal of the eccentric and wedge is illustrated in the small lug shown in connection with the arrow *b* in Figure 5. When the wheel is rotated backwardly, the eccentric and wedge engage the clamping ring tightly as before, so that there is never an opportunity for the latter to become loose, as it might were the reverse clamping lug not provided.

Preparatory to removing the clamping ring C and associated parts, it is necessary only to apply a wrench to the non-circular part 4 and force the clamp lugs 1 down until the eccentric and wedge portions assume positions out of the path of the clamping ring, which latter is then easily removed. By avoiding loosening the nuts on the bolts B, the displaced lugs on one side of the wheel will not fall over when the wheel is turned around.

It is proposed to supply a special wrench with each set of lugs. Such a wrench will have a place to span the non-circular part 4, and a place to fit the nut on the bolt B, so that the latter may be fastened or unfastened.

While the construction and arrangement of the improved clamp lug as herein described and claimed, is that of a generally preferred form, obviously modifications and changes may be made without departing from the spirit of the invention or the scope of the claims.

I claim :—

1. In combination with a wheel having a felly carrying a bolt beneath a clamping ring which retains tire holding means, and a clamp lug with wedge surfaces engaging both beneath and at the side of the ring when finally secured on the bolt, thereafter tending to increase the frictional contact of both on rotational impulses of the wheel.

2. A clamp lug having a wedge surface for exerting radial pressure and a second wedge surface for exerting lateral pressure, both against a clamping ring when the lug is turned on a bolt therebeneath.

3. A clamp lug, comprising a substantially circular body with wedges both at the periphery and a place below the periphery, the former being disposed to exert lateral pressure, the latter radial pressure, when the lug is turned on a bolt beneath a clamping ring which the lug contacts.

4. A clamp lug, comprising a substantially circular body having a peripheral wedge for exerting lateral pressure on a clamping ring, and an eccentric below the periphery with its lobe adjacent to the thick part of the wedge for exerting radial pressure on said ring when the lug is turned on a supporting bolt.

SHADE B. COLLIER.